US010057122B1

(12) United States Patent
Andersen et al.

(10) Patent No.: US 10,057,122 B1
(45) Date of Patent: Aug. 21, 2018

(54) METHODS, SYSTEMS, AND COMPUTER READABLE MEDIUMS FOR SYSTEM CONFIGURATION OPTIMIZATION

(71) Applicant: VCE Company, LLC, Richardson, TX (US)

(72) Inventors: Ryan Joseph Andersen, Belmont, MA (US); Donald Edward Norbeck, Jr., Lafayette Hill, PA (US); Jonathan Peter Streete, San Jose, CA (US); Seamus Patrick Kerrigan, Ballincollig (IE)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 193 days.

(21) Appl. No.: 14/919,917

(22) Filed: Oct. 22, 2015

(51) Int. Cl.
*G06F 15/177* (2006.01)
*H04L 12/24* (2006.01)
*H04L 29/08* (2006.01)

(52) U.S. Cl.
CPC ...... *H04L 41/0823* (2013.01); *H04L 67/1097* (2013.01)

(58) Field of Classification Search
CPC .................. H04L 41/0823; H04L 67/1097
See application file for complete search history.

(56) References Cited

U.S. PATENT DOCUMENTS

| 2010/0169893 | A1* | 7/2010 | Collins | G06F 9/5044 718/105 |
| 2016/0087910 | A1* | 3/2016 | Mittal | H04L 67/1097 709/226 |
| 2016/0323377 | A1* | 11/2016 | Einkauf | H04L 67/1076 |
| 2017/0147406 | A1* | 5/2017 | Birkestrand | G06F 9/5044 |

* cited by examiner

*Primary Examiner* — John B Walsh
(74) *Attorney, Agent, or Firm* — Jenkins, Wilson, Taylor & Hunt P.A.

(57) ABSTRACT

Methods, systems, and computer readable mediums for optimizing a system configuration are disclosed. In some examples, a method includes determining whether a system configuration for executing a workload using a distributed computer system is optimizable and in response to determining that the system configuration is optimizable, modifying the system configuration such that at least one storage resource for storing workload data is located at a server node that is executing the workload in the distributed computer system.

17 Claims, 6 Drawing Sheets

METHODS, SYSTEMS, AND COMPUTER READABLE MEDIUMS FOR SYSTEM CONFIGURATION OPTIMIZATION

TECHNICAL FIELD

This specification relates generally to computer system configuration optimization, e.g., by configuring and aligning storage resources and workloads at server nodes in a distributed computing system.

BACKGROUND

In a software-defined storage enabled computer system, a computer system can include a number of computing devices, e.g., server nodes with processors and networking capability. Physical storage resources (e.g., storage devices, hard drives, memory chips, or spindles) can be integrated with the computing devices and therefore distributed throughout the computer system. Software-defined storage management software can create and manage storage pools including the distributed storage resources, where the storage pools are used by one or more computing devices in the computer system to execute workloads (e.g., processing stored data, executing virtual machines (VMs), or other tasks). However, as workloads are created, moved, and terminated (e.g., completed) on a distributed computing system, the resulting system configuration may become suboptimal from a risk, performance, and/or capacity perspective. For example, workloads and related storage resources may become misaligned, e.g., associated with different server nodes.

SUMMARY

This specification describes methods, systems, and computer readable mediums for system configuration optimization. In some examples, a method includes determining whether a system configuration for executing a workload using a distributed computer system is optimizable and in response to determining that the system configuration is optimizable, modifying the system configuration such that at least one storage resource for storing workload data is located at a server node that is executing the workload in the distributed computer system.

BRIEF DESCRIPTION OF THE DRAWINGS

The subject matter described herein will now be explained with reference to the accompanying drawings of which.

DETAILED DESCRIPTION

Figure 1:
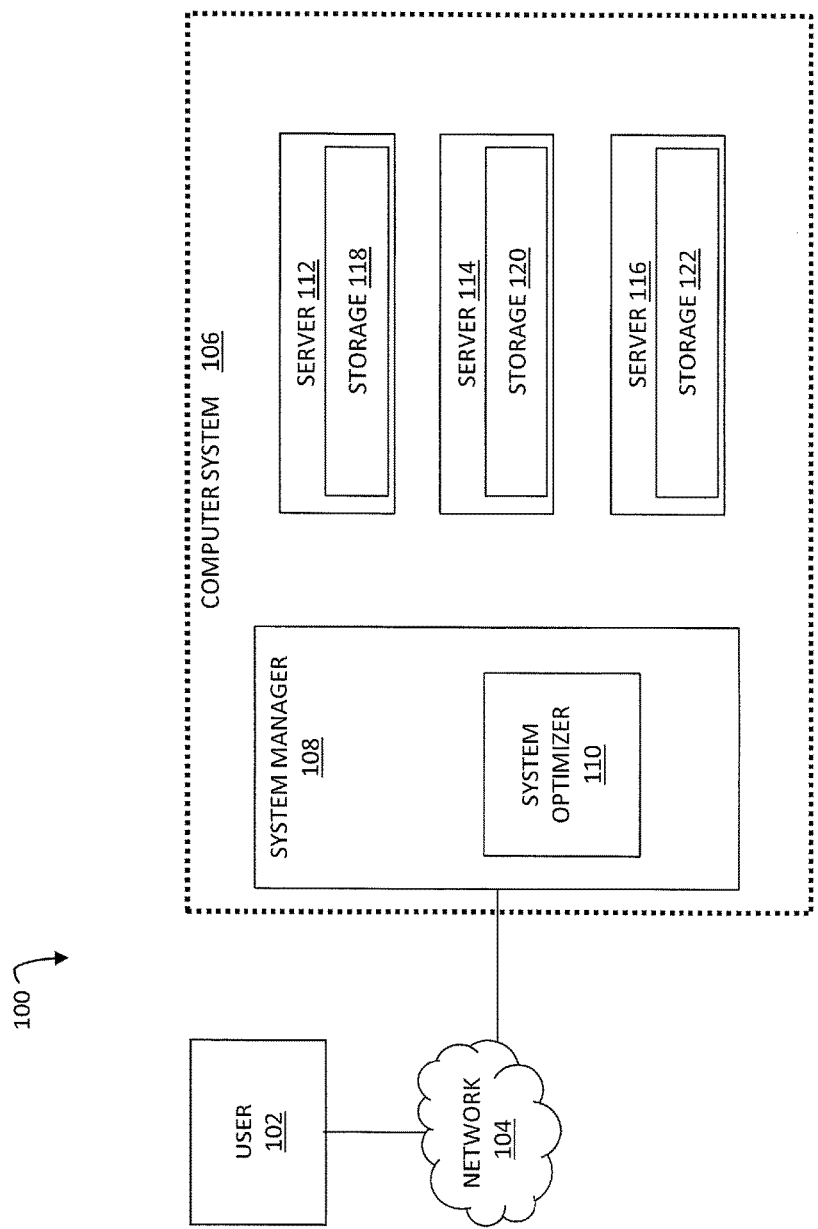
FIG. 1 is a block diagram illustrating a computer environment according to an embodiment of the subject matter described herein.

When deploying a computing system that includes multiple server nodes with directly attached storage devices that are pooled for aggregated access, the storage pools may become fragmented and misaligned with the server workloads that utilize those pools. Conventional software-defined storage enabled computing systems lack the capability of automatically detecting, recommending, and/or performing system configuration optimizations involving realigning workloads and related system resources. Instead of automatically detecting, recommending, and/or performing system configuration optimizations, system operators generally must manually inspect the configuration of each workload mount point, and reference static error prone documentation to determine the extent of misalignment. After manual inspection of mount points and documentation, the system operators may determine what an optimal configuration would look like and may develop a migration plan for implementing the optimal configuration.

The systems, methods, and computer readable mediums described in this specification can be used for detecting that a system configuration is optimizable. For example, one or more methods, techniques, mechanisms, and/or devices may be used for detecting whether a system configuration (e.g., associated with a workload) is optimizable by determining that an adequate amount of physical storage associated with a workload (e.g., for storing workload data or a mount point for the workload) is not located at a server node executing the workload. In this example, if an adequate amount of physical storage associated with a workload is not located at a server node executing the workload, then it may be determined whether unallocated or available physical storage resources are located at a server node executing the workload or whether the workload can moved to a different server node that includes physical storage resources associated with a workload.

The systems, methods, and computer readable mediums described in this specification can be used for recommending and/or implementing system configuration optimization. For example, when a storage pool becomes fragmented and/or misaligned such that a workload is being executed on a server node different from where the workload is mounted and/or where its associated physical storage is located, one or more methods, techniques, mechanisms, and/or devices may be used for recommending and/or implementing system configuration optimization. In this example, system configuration optimization may involve performing a storage pool expansion (e.g., adding one or more physical storage resources to a storage pool associated with a workload, where the physical storage resources are located at a server node executing the workload) and/or performing a workload migration (e.g., moving a workload from one server node to another server node so that the server node executing a workload is also the server node where physical storage resources associated with the workload are located).

FIG. 1 is a block diagram illustrating a computer environment 100 according to an embodiment of the subject matter described herein. Computer environment 100 includes a user 102, a network 104, and a computer system 106. User 102 may represent a human operator, a user device, or other entity (e.g., a client node) for interacting with computer system 106. In some embodiments, network 104 may represent the Internet or a communications network for facilitating communications between user 102 and computer system 106 or portions thereof.

Computer system 106 may include a system manager 108 and server nodes 112, 114, and 116. For example, computer system 106 may represent a distributed computer system, such as a hyper-converged system or a converged system, implemented using server nodes 112, 114, and 116, where each server node interacts with each other via network 104 and/or another network. In this example, the components or resources associated with computer system 106 may communicate or interact with one another and/or other entities (e.g., user 102) using one or more communications protocols (e.g., Internet protocol (IP) or Ethernet).

Server nodes 112, 114, and 116 may include computer systems that include physical components for data processing, data storage, and data communication. For example, server nodes 112 can include one or more physical storages (e.g., hard drives, flash drives, and/or storage devices) integrated with at least one compute component (e.g., a physical processor, an application-specific integrated circuit (ASIC), and/or a field-programmable gate array (FPGA)). In this example, a physical storage may include one or more physical storage resources (e.g., a non-transitory computer readable medium, a hard drive, a flash drive, a memory device, and/or a storage device) for storing data.

Physical storages 118, 120, and 122 may be integrated with server nodes 112, 114, and 116, respectively, to create a distributed storage system, e.g., by virtue of software that implements the storage application executing on the same one or more processors that run distributed computing applications. In some embodiments, computer system 106 includes physical storages that are not integrated with compute nodes, in addition to server nodes 112, 114, and 116.

In some embodiments, server nodes 112, 114, and 116 and/or physical storages 118, 120, and 122 may be associated with equipment racks and/or chassis. For example, a first equipment rack may be located in a first geographical location and may include a number of chassis and each chassis may include one or more server nodes. In this example, a second equipment rack may be located in a second geographical location different from the first geographical location and may include a number of chassis and each chassis may include one or more server nodes.

System manager 108 may include a computer system comprising one or more computers configured, by virtue of appropriate programming, to perform virtualization using server nodes 112, 114, and 116. Performing virtualization can include abstracting software and/or hardware components and presenting the abstraction as a new logical entity, or sharing physical resources between multiple isolated services. For example, system manager 108 can be configured to distribute various computing tasks or workloads across server nodes 112, 114, and 116. In this example, a workload may include a virtual machine (VM) instance and/or a virtualization container, e.g., a logical package containing an application and/or a framework with all of its dependencies.

System manager 108 may be configured to store data across server nodes 112, 114, and 116. System manager 108 may establish storage pools (e.g., logical pools of data storage) using physical storages 118, 120, and 122 and may present a storage pool to an application executing in computer system 106 as a single logical storage volume. System manager 108 may also be configured to mirror and/or move data across physical storages. For example, system manager 108 can be configured so that, when an application writes to a storage pool, data that is written to particular physical storage is also written to an assigned mirror storage node.

In some embodiments, system optimizer 110 may be configured to access information about server nodes 112, 114, and 116, workloads, and software defined storage system via an application programming interface (API) or other interface. For example, system optimizer 110 may identify or obtained information from system manager 108 and/or other components, systems, and/or entities. In this example, system optimizer 110 may use the obtained data for automating the detection of optimizable system configurations and for recommending and, optionally, initiating (e.g., automatically or based on user input) system configuration changes for aligning workloads and associated physical storage resources with appropriate server nodes.

In some embodiments, system optimizer 110 may be configured to determine whether computer system 106 is optimizable. For example, system optimizer 110 and/or an optimization algorithm may be configured to inspect a storage pool configuration, server hardware (e.g. physical storage resources), and mounting points at both bare metal and virtual workload level. In this example, system optimizer 110 may determine, for each workload, whether the workload is associated with a storage pool that include at least some physical storage resources located at a same server node as where the workload is being executed. Continuing with this example, if a workload and its associated physical storage resources are misaligned, system optimizer 110 may determine that computer system 106 is optimizable.

In some embodiments, system optimizer 110 may be configured to recommend system configuration optimizations and/or to implement system configuration optimizations. For example, system optimizer 110 and/or an optimization algorithm may be configured to optimize the alignment of workloads and associated physical storage resources. In this example, optimizing computer system 106 may involve aligning a storage pool's physical storage resources with a related workload, e.g., the storage pool associated with the workload may be reconfigured (e.g., expanded) to include an adequate amount of physical storage (e.g., one or more allocable hard drives or an amount of storage space therein) on a server where the workload executes or operates or the workload may be moved to a server where the pool has an adequate amount of physical storage. By optimizing system configurations, network traffic, the impact of network failures, and read/write times associated with workloads may be decreased and/or minimized.

In some embodiments, optimizing computer system 106 may involve moving a workload from one server node to another server node. For example, assuming that server node 112 is currently executing a workload including a VM instance and that system optimizer 110 determines that computer system 106 can be optimized by moving the workload from server node 112 to server node 114. In this example, system optimizer 110, system manager 108, or another entity may initiate a workload migration by using a workload migration service, or by pausing or stopping the workload instance and storing state information in a related storage pool for restarting the workload instance in a recent state. Continuing with this example, after the workload has been moved to server node 114, the workload instance may be restarted using the stored state information to minimize the impact of the workload migration.

Although FIG. 1 illustrates an example computer system 106, the systems, methods, and computer readable mediums described in this specification can be used in any appropriate distributed computing system. In general, an appropriate distributed computing system implements a distributed data storage system that includes multiple server nodes, each being integrated with physical storage resources.

It will be appreciated that FIG. 1 is for illustrative purposes and that various components, their locations, and/or their functions as described above in relation to FIG. 1 can be changed, altered, added, or removed. Further, aspects of the disclosed subject matter (e.g., system optimizer 110) can be implemented and/or located on any computing system or components therein.

Figure 2:
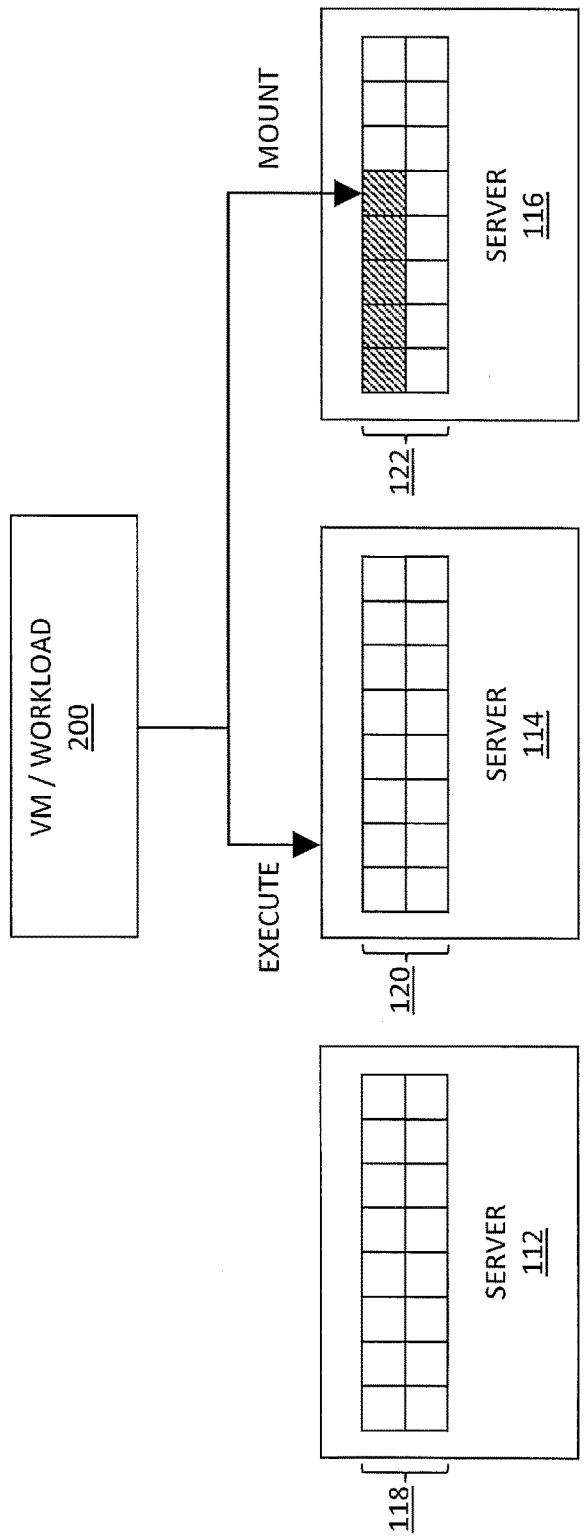
FIG. 2 is a diagram illustrating a suboptimal system configuration according to an embodiment of the subject matter described herein.

FIG. 2 is a diagram illustrating a suboptimal system configuration according to an embodiment of the subject matter described herein. In FIG. 2, physical storages 118, 120, and 122 are each represented by a number of blocks, where each block represents a physical storage resource, such as a hard drive, a memory chip, a flash drive, or portions thereof. Each physical storage resource (block) in FIG. 2 is also designated as allocated (a diagonal fill pattern) or unallocated (white or unfilled space).

In some embodiments, a suboptimal or misaligned system configuration may involve a workload being executed on a server node different from where the workload is mounted and/or where related storage is located. For example, as depicted in FIG. 2, workload 200 may be mounted or stored, or use data stored in one or more physical storage resources (e.g., represented as diagonal fill pattern blocks in FIG. 2) of storage 122 at server 116 and may be executed, e.g., using compute components or physical processors, at server 114.

In some embodiments, system optimizer 110 may be configured to detect a suboptimal or misaligned system configuration and may notify user 102. In some embodiments, system optimizer 110 may be configured to recommend and/or implement an optimized system configuration using various factors, e.g., system characteristics, user preferences, network conditions, storage resource availability, compute resource availability, and/or workload requirements.

Figure 3:
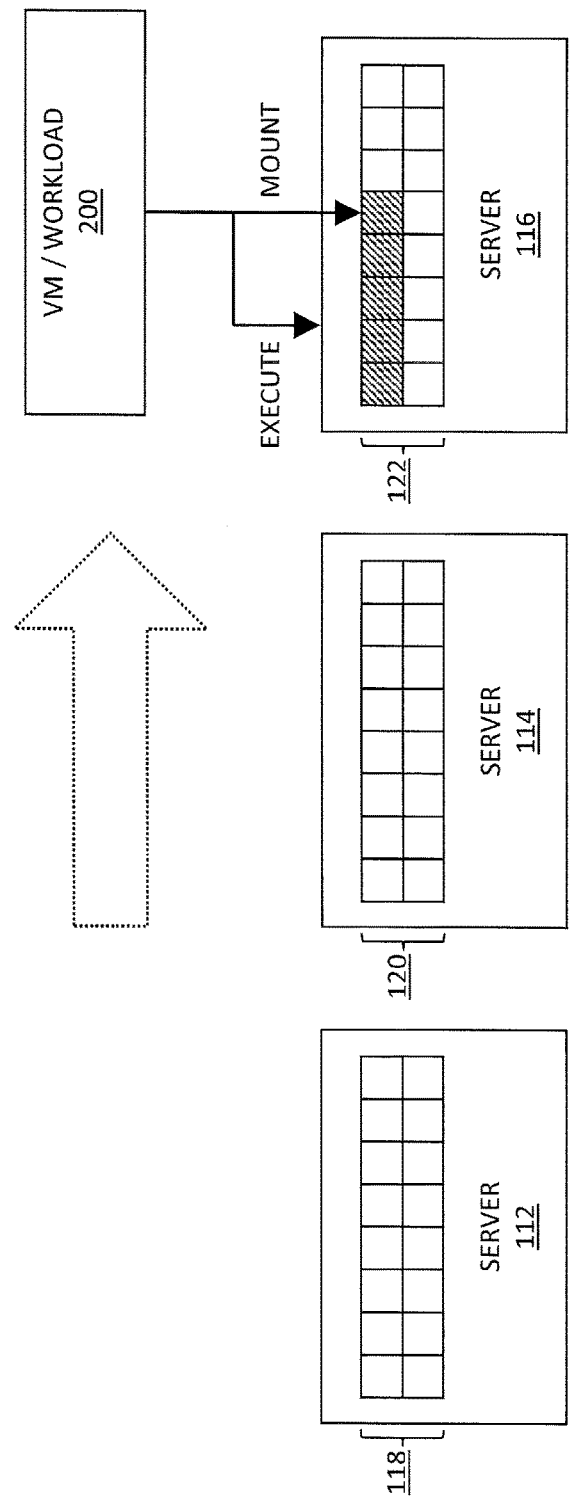
FIG. 3 is a diagram illustrating an optimized system configuration according to an embodiment of the subject matter described herein.

FIG. 3 is a diagram illustrating an optimized system configuration according to an embodiment of the subject matter described herein. In FIG. 3, physical storages 118, 120, and 122 are each represented by a number of blocks, where each block represents a physical storage resource, such as a hard drive, a memory chip, a flash drive, or portions thereof. Each physical storage resource (block) in FIG. 3 is also designated as allocated (a diagonal fill pattern) or unallocated (white or unfilled space).

In some embodiments, an optimized system configuration may involve moving a workload from one server node to another server node so that the server node executing the workload is also the server node where at least some physical storage resources associated with the workload are located. For example, as depicted in FIG. 3, workload 200 may be mounted or stored, or use data stored in one or more physical storage resources (e.g., represented as diagonal fill pattern blocks in FIG. 3) of storage 122 at server 116. In this example, system optimizer 110 may move workload 200 from executing at server 114 to server 116. By moving workload 200 to server 116, execution of workload 200 may be more efficient and/or optimized since server 116 can execute workload 200 while utilizing local physical storage resources for mounting workload 200 or storing workload data. Further, network traffic, the impact of network failures, and read/write times associated with workload 200 may be decreased and/or minimized since communications among multiple different server nodes in computing system 106 may be unnecessary for execution of workload 200.

In some embodiments, system optimizer 110 may utilize an optimization algorithm that determines whether and/or when workload 200 may be moved to another server node. For example, an optimization algorithm may take into account whether a server node has available compute components (e.g., physical processors) to execute workload 200 as well as whether the time or bandwidth needed to make the move is acceptable, e.g., based on user preferences and/or workload requirements, before determining whether to recommend or implement (e.g., automatically or semi-automatically) a workload migration from one server node to another server node. In this example, the optimization algorithm may also determine, suggest, and/or notify user 102 with a suggested time to perform the workload migration, e.g., based on predicted loads or network conditions. In another example, after suggesting a workload migration, an optimization algorithm may indicate an amount of time needed for completing the workload migration (e.g., using historical information based on similar operations and/or current operating loads) and/or may request instructions (e.g., a time and/or a server node location) from user 102 for initiating the workload migration.

Figure 4:
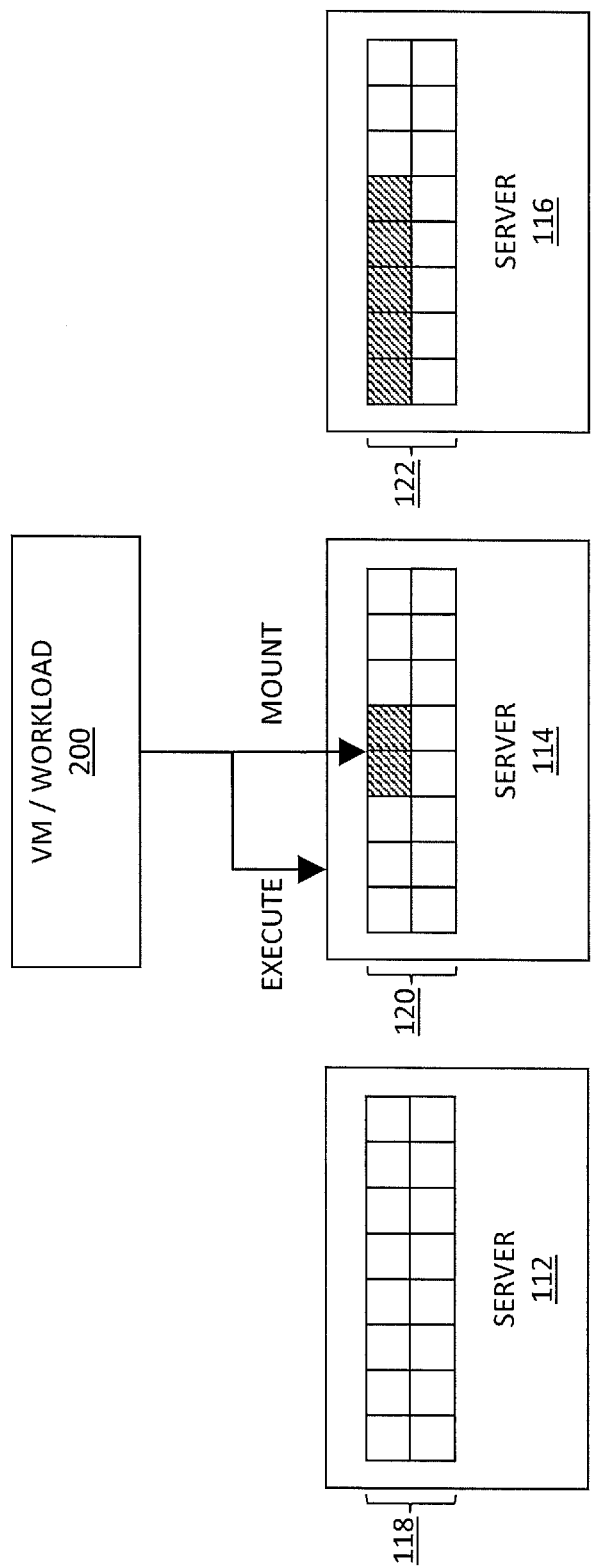
FIG. 4 is a diagram illustrating another optimized system configuration according to an embodiment of the subject matter described herein.

FIG. 4 is a diagram illustrating another optimized system configuration according to an embodiment of the subject matter described herein. In FIG. 4, physical storages 118, 120, and 122 are each represented by a number of blocks, where each block represents a physical storage resource, such as a hard drive, a memory chip, a flash drive, or portions thereof. Each physical storage resource (block) in FIG. 4 is also designated as allocated (a diagonal fill pattern) or unallocated (white or unfilled space).

In some embodiments, an optimized system configuration may involve adding a physical storage resource to a storage pool associated with a workload, where the physical storage resource is located at the server node executing the workload. For example, as depicted in FIG. 4, workload 200 may be executed at server 114. In this example, system optimizer 110 may add one or more physical storage resources (e.g., represented as diagonal fill pattern blocks in FIG. 4) located at server 114 to a storage pool associated with the workload. By performing storing pool expansion, execution of workload 200 may be more efficient and/or optimized since server 114 can execute workload 200 while utilizing local physical storage resources for mounting workload 200 or storing workload data. Further, network traffic, the impact of network failures, and read/write times associated with workload 200 may be decreased and/or minimized since communications among multiple different server nodes in computing system 106 may be unnecessary for execution of workload 200.

In some embodiments, system optimizer 110 may utilize an optimization algorithm that determines whether and/or when additional physical storage resources may be added to a storage pool associated with workload 200. For example, an optimization algorithm may take into account whether a server node currently executing workload 200 has available or unallocated physical storage resources (e.g., spindles, hard drives, or storage space therein) before determining to recommend or implement (e.g., automatically or semi-automatically) an storage pool expansion e.g., adding a physical storage resource to a current storage pool associated with workload 200. In this example, the optimization algorithm may also determine, suggest, and/or notify user 102 with a suggested time to perform the storage pool expansion (e.g., based on predicted loads or network conditions). In another example, after suggesting a storage pool expansion, an optimization algorithm may indicate an amount of time needed for completing the storage pool expansion (e.g., using historical information based on similar operations and/or current operating loads) and/or may request instructions (e.g., a time and/or a physical storage resource identifier) from user 102 for initiating the storage pool expansion.

Figure 5:
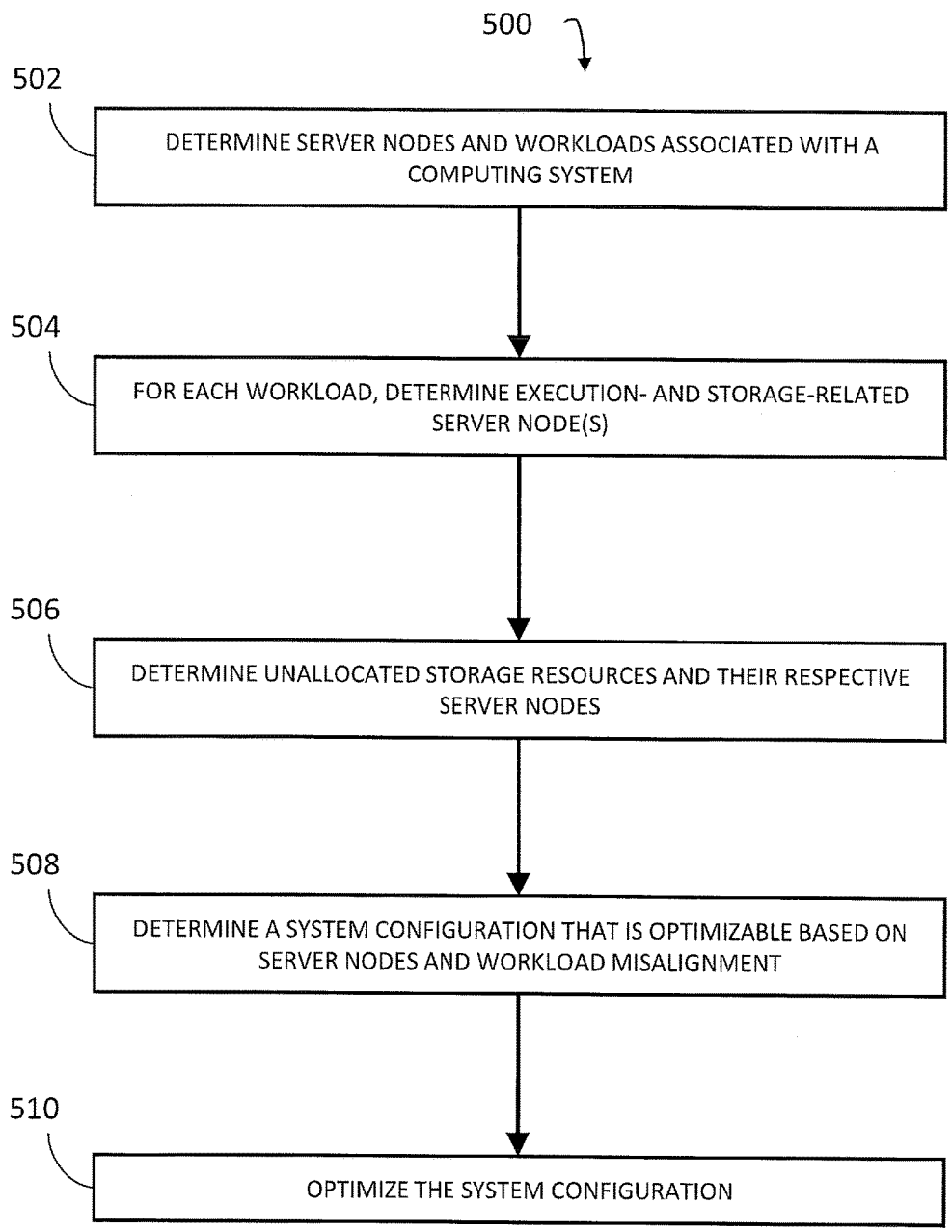
FIG. 5 is a diagram illustrating a method for system configuration optimization according to an embodiment of the subject matter described herein.

FIG. 5 is a diagram illustrating a method 500 for system configuration optimization according to an embodiment of the subject matter described herein. In some embodiments, method 500 or portions therein (e.g., steps 502, 504, 506, 508, and/or 510) can include actions or operations performed by computer system 106, system manager 108, system optimizer 110, and/or other module(s) or node(s) (e.g., one or more servers or computers containing one or more processors and memory). For example, system optimizer 110 or an optimization algorithm implemented using one or more physical computers may perform method 500 or portions therein. For illustrative purposes and explanation, references to entities included in FIGS. 1-4 may be used below.

Referring to method 500, in step 502, server nodes and workloads that are associated with a computer system may be determined. For example, system optimizer 110 may identify five workloads and three server nodes at computer system 106.

In step 504, for each workload, execution- and storage-related server node(s) may be determined. For example, after determining a number of workloads associated with computer system 106, system optimizer 110 may inspect each workload to determine the server node(s) where each workload operates or executes. In this example, system optimizer 110 may also inspect each workload to determine one or more storage pool identifiers associated with each workload (e.g., where each workload stores data or is mounted). Continuing with this example, system optimizer 110 may use the storage pool identifiers to trace or identify physical storage resources (e.g., hard drives or other storage devices) associated with each workload's storage pool(s) and may identify one or more server nodes where these physical storage resources are located.

In step 506, unallocated storage resources and their respective server nodes may be determined. For example, unallocated physical storage resources may be identified at server 112, server 114, and server 116. In this example, an unallocated physical storage resource may include a hard drive or storage space therein that is available to be used by a workload or allocated to a storage pool associated with a workload.

In step 508, a system configuration may be determined to be optimizable. For example, system optimizer 110 may analyze an alignment between workload 200 and its physical storage resources. In this example, analyzing an alignment between workload 200 and its physical storage resources may involve determining whether workload 200 is utilizing a storage pool that has or includes an adequate amount of physical storage (e.g., as determined by operator preferences or workload requirements) at a server node on which workload 200 is operating or executing. Continuing with this example, if system optimizer 110 determines that workload 200 is utilizing a storage pool that does not have or include an adequate amount of physical storage at the server node on which workload 200 is operating or executing, system optimizer 110 may recommend and/or implement a system configuration optimization resulting in an adequate amount of physical storage being located at the server node on which workload 200 is operating or executing.

In step 510, the system configuration may be optimized. For example, system optimizer 110 may move a workload or change a storage pool configuration to align the workload and its associated physical storage resources. In this example, system optimizer 110 may move a workload based on operator preferences, e.g., to a server node assigned by the operator to execute or handle certain workloads or workload types. In another example, system optimizer 110 may expand a storage pool in lieu of moving a working based on operator preferences or other considerations, e.g., storage pool expansion may be performed more quickly than moving a workload from one server node to another server node.

It will be appreciated that FIG. 5 is for illustrative purposes and that additional and/or different steps than those depicted in FIG. 5 can be usable for system configuration optimization. Additionally, it will be appreciated that steps depicted in FIG. 5 can occur in a different order than depicted in FIG. 5 or may be performed concurrently with other steps.

Figure 6:
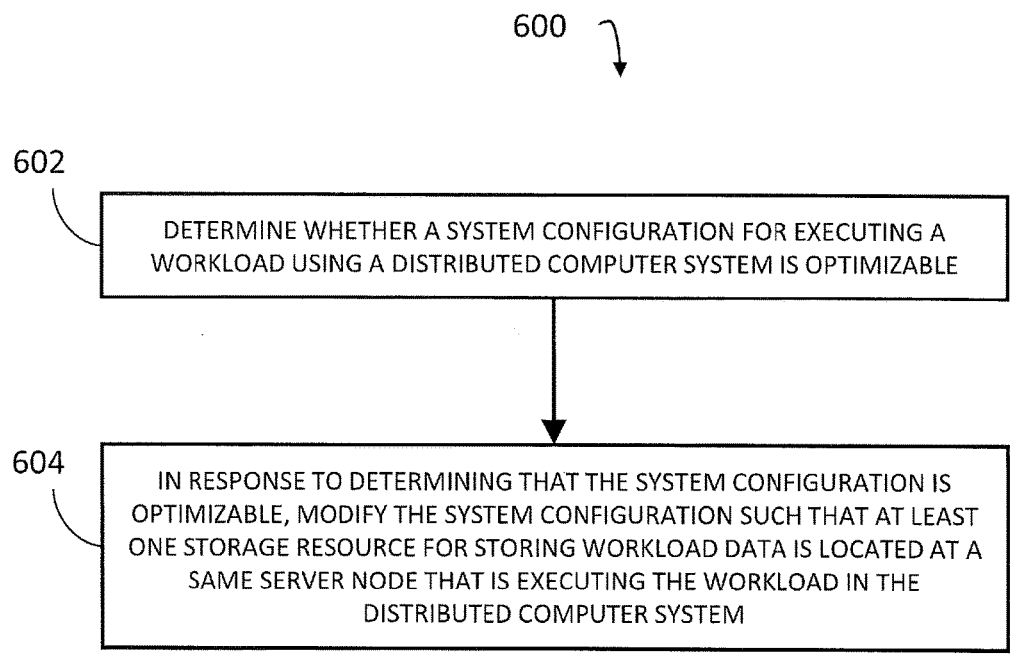
FIG. 6 is a diagram illustrating another method for system configuration optimization according to an embodiment of the subject matter described herein.

FIG. 6 is a diagram illustrating another method 600 for system configuration optimization according to an embodiment of the subject matter described herein. In some embodiments, method 600 or portions therein (e.g., steps 602 and/or 604) can include actions or operations performed by computer system 106, system manager 108, system optimizer 110, and/or other module(s) or node(s) (e.g., one or more servers or computers containing one or more processors and memory). For example, system optimizer 110 or an optimization algorithm implemented using one or more physical computers may perform method 600 or portions therein. For illustrative purposes and explanation, references to entities included in FIGS. 1-4 may be used below.

Referring to method 600, in step 602, it is determined whether a system configuration for executing a workload using a distributed computer system is optimizable.

In some embodiments, a workload can include at least one of a group comprising a virtual machine implementation, a virtualization container, a set of executable instructions, and data for processing. For example, workload 200 may represent a VM instance associated with web server functionality. In another example, workload 200 may represent or include a virtualization container that includes an application and its dependencies, where the virtualization container uses resource isolation and/or separate namespaces to isolate the application's view of an underlying operating system (OS). In this example, one or more virtualization containers may execute in a single VM or OS instance.

In some embodiments, a storage resource can include a hard drive, a flash drive, a physical memory, a non-transitory computer readable medium, and/or a physical storage device. For example, storage 122 can include one or more storage resources, such as hard drives, flash drives, memory chips, or other storage devices.

In some embodiments, determining whether a system configuration is optimizable includes determining a set of workloads and a set of server nodes associated with a distributed computer system.

In some embodiments, determining that a system configuration is optimizable can include determining that none of at least one storage resource for storing workload data is located at a server node executing the workload. For example, system optimizer 110 may detect a suboptimal system configuration as depicted in FIG. 2.

In step 604, in response to determining that the system configuration is optimizable, the system configuration is modified such that at least one storage resource for storing workload data is located at a server node that is executing the workload in the distributed computer system.

In some embodiments, modifying a system configuration can include moving a workload from a first server node to a second server node. For example, system optimizer 110 may move workload 200 from server 114 to server 116 as depicted in FIG. 3.

In some embodiments, modifying a system configuration can include assigning an additional storage resource for storing workload data with a workload, wherein the additional storage resource is located at a server node executing the workload. For example, system optimizer 110 may add a storage resource from server 114 to a storage pool associated with workload 200, where server 114 executes workload 200 as depicted in FIG. 4.

It will be appreciated that FIG. 6 is for illustrative purposes and that additional and/or different steps than those depicted in FIG. 6 can be usable for system configuration optimization. Additionally, it will be appreciated that steps depicted in FIG. 6 can occur in a different order than depicted in FIG. 6 or may be performed concurrently with other steps.

It should be noted that computer system 106, system manager 108, system optimizer 110, and/or functionality described herein can constitute a special purpose computing system. Further, computer system 106, system manager 108, system optimizer 110, and/or functionality described herein can improve the technological field of distributed computer systems by optimizing system configurations for executing workloads. For example, system optimizer 110 and/or an optimization algorithm may be configured to inspect a storage pool configuration, server hardware (e.g. physical storage resources), and mounting points at both bare metal and virtual workload level and make recommendations for reconfiguring computer system 106 to optimize alignment of workloads and associated physical storage. By optimizing system configurations, network traffic, network failures, and read/write times associated with one or more workloads may be decreased and/or minimized.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
   analyzing a system configuration for a workload executing using physical resources in a distributed computer system, wherein the workload is executed by at least one server node in the distributed computing system;
   determining that the system configuration is optimizable, wherein determining that the system configuration is optimizable includes determining that the workload and associated storage resources are misaligned, wherein determining that the workload and associated storage resources are misaligned includes determining that none of at least one storage resource for storing workload data is located at the at least one server node executing the workload; and
   in response to determining that the system configuration is optimizable, modifying the system configuration including performing a storage pool expansion or a workload migration such that the at least one storage resource for storing workload data is located at the at least one server node that is executing the workload in the distributed computer system.

2. The method of claim 1 wherein the workload includes at least one of a group comprising a virtual machine implementation, a virtualization container, a set of executable instructions, and data for processing.

3. The method of claim 1 wherein the storage resource includes at least one of a group comprising a hard drive, a flash drive, a physical memory, a non-transitory computer readable medium, and a physical storage device.

4. The method of claim 1 wherein modifying the system configuration includes moving the workload from a first server node to a second server node.

5. The method of claim 1 wherein modifying the system configuration includes assigning an additional storage resource for storing workload data with the workload, wherein the additional storage resource is located at the at least one server node executing the workload.

6. The method of claim 1 wherein determining whether the system configuration is optimizable includes determining a set of workloads and a set of server nodes associated with the distributed computer system.

7. A system comprising:
   one or more physical computers;
   at least one processor; and
   a system optimizer implemented using the at least one processor and the one or more physical computers for performing operations comprising:
     analyzing a system configuration for a workload executing using physical resources in a distributed computer system, wherein the workload is executed by at least one server node in the distributed computing system;
     determining that the system configuration is optimizable, wherein determining that the system configuration is optimizable includes determining that the workload and associated storage resources are misaligned, wherein determining that the workload and associated storage resources are misaligned includes determining that none of at least one storage resource for storing workload data is located at [[a]] the at least one server node executing the workload; and
     in response to determining that the system configuration is optimizable, modifying the system configuration such that the at least one storage resource for storing workload data is located at the at least one server node that is executing the workload in the distributed computer system.

8. The system of claim 7 wherein the workload includes at least one of a group comprising a virtual machine implementation, a virtualization container, a set of executable instructions, and data for processing.

9. The system of claim 7 wherein the storage resource includes at least one of a group comprising a hard drive, a flash drive, a physical memory, a non-transitory computer readable medium, and a physical storage device.

10. The system of claim 7 wherein the system optimizer is configured to modify the system configuration includes moving the workload from a first server node to a second server node.

11. The system of claim 7 wherein the system optimizer is configured to modify the system configuration includes assigning an additional storage resource for storing workload data with the workload, wherein the additional storage resource is located at the at least one server node executing the workload.

12. The system of claim 7 wherein the system optimizer is configured to determine a set of workloads and a set of server nodes associated with the distributed computer system.

13. A non-transitory computer readable medium having stored thereon executable instructions which, when executed by one or more physical computers, cause the one or more physical computers to perform operations comprising:
    analyzing a system configuration for a workload executing using physical resources in a distributed computer system, wherein the workload is executed by at least one server node in the distributed computing system;
    determining that the system configuration is optimizable, wherein determining that the workload and associated storage resources are misaligned, wherein determining that the workload and associated storage resources are misaligned includes determining that the system configuration is optimizable includes determining that none of at least one storage resource for storing workload data is located at the at least one server node executing the workload; and
    in response to determining that the system configuration is optimizable, modifying the system configuration such that the at least one storage resource for storing workload data is located at the at least one server node that is executing the workload in the distributed computer system.

14. The non-transitory computer readable medium of claim 13 wherein the workload includes at least one of a group comprising a virtual machine implementation, a virtualization container, a set of executable instructions, and data for processing.

15. The non-transitory computer readable medium of claim 13 wherein the storage resource includes at least one of a group comprising a hard drive, a flash drive, a physical memory, a non-transitory computer readable medium, and a physical storage device.

16. The non-transitory computer readable medium of claim 13 wherein modifying the system configuration includes moving the workload from a first server node to a second server node.

17. The non-transitory computer readable medium of claim 13 wherein modifying the system configuration includes assigning an additional storage resource for storing workload data with the workload, wherein the additional storage resource is located at the at least one server node executing the workload.

* * * * *